(12) United States Patent
Kane

(10) Patent No.: US 7,854,653 B2
(45) Date of Patent: Dec. 21, 2010

(54) SYSTEM AND METHOD FOR PLAYING A ROLE-PLAYING GAME

(75) Inventor: Steven N. Kane, Brookline, MA (US)

(73) Assignee: GameLogic, Inc., Waltham, MA (US)

( * ) Notice: Subject to any disclaimer, the term of this patent is extended or adjusted under 35 U.S.C. 154(b) by 365 days.

(21) Appl. No.: 11/137,785

(22) Filed: May 25, 2005

(65) Prior Publication Data

US 2005/0282624 A1  Dec. 22, 2005

Related U.S. Application Data

(60) Provisional application No. 60/574,144, filed on May 25, 2004.

(51) Int. Cl.
*A63F 9/24* (2006.01)
(52) U.S. Cl. .......................................... 463/9
(58) Field of Classification Search ...................... 463/9
See application file for complete search history.

(56) References Cited

U.S. PATENT DOCUMENTS

| | | | | |
|---|---|---|---|---|
| 5,034,807 | A | * | 7/1991 | Von Kohorn ................... 725/5 |
| RE35,864 | E | * | 7/1998 | Weingardt ................... 463/28 |
| 6,012,983 | A | | 1/2000 | Walker et al. |
| 6,364,765 | B1 | | 4/2002 | Walker et al. |
| 6,523,829 | B1 | | 2/2003 | Walker et al. |
| 6,540,230 | B1 | | 4/2003 | Walker et al. |
| 6,582,310 | B1 | * | 6/2003 | Walker et al. ................. 463/42 |
| 6,607,439 | B2 | | 8/2003 | Scheneier et al. |
| 6,679,497 | B2 | | 1/2004 | Walker et al. |
| 6,692,353 | B2 | | 2/2004 | Walker et al. |
| 6,758,746 | B1 | * | 7/2004 | Hunter et al. ................... 463/9 |
| 6,790,141 | B2 | * | 9/2004 | Muir ........................... 463/42 |
| 6,843,724 | B2 | | 1/2005 | Walker et al. |
| 7,076,445 | B1 | * | 7/2006 | Cartwright ................... 705/14 |
| 2002/0002074 | A1 | | 1/2002 | White |
| 2002/0039921 | A1 | | 4/2002 | Rowe et al. |
| 2002/0090987 | A1 | | 7/2002 | Walker et al. |
| 2002/0147040 | A1 | | 10/2002 | Walker et al. |
| 2003/0045346 | A1 | * | 3/2003 | Watanabe ..................... 463/20 |
| 2003/0078102 | A1 | * | 4/2003 | Okita et al. ................... 463/42 |
| 2003/0114217 | A1 | | 6/2003 | Walker et al. |
| 2003/0155715 | A1 | | 8/2003 | Walker et al. |
| 2003/0218303 | A1 | | 11/2003 | Walker et al. |
| 2004/0142741 | A1 | | 7/2004 | Walker et al. |
| 2004/0147308 | A1 | | 7/2004 | Walker et al. |
| 2005/0049042 | A1 | | 3/2005 | Walker et al. |
| 2006/0211480 | A1 | * | 9/2006 | Walker et al. ................. 463/16 |

OTHER PUBLICATIONS

Midway Amusement Games, Mortal Kombat Deadly Alliance Instruction Booklet, Copyright 2002, pp. 3-23.*
STIC Search History.*
Supplementary European Search Report based on PCT/2005/018279.

* cited by examiner

*Primary Examiner*—Dmitry Suhol
*Assistant Examiner*—Malina K Rustemeyer
(74) *Attorney, Agent, or Firm*—Lando & Anastasi, LLP

(57) ABSTRACT

A method and apparatus for playing role-playing game is provided that involves wagering. In one example game, players subscribe to multiple game sessions and eliminate other players to become the sole survivor of the game. The players may accrue points by eliminating other players. Further, players may eliminate other players in a combat environment.

36 Claims, 9 Drawing Sheets

SYSTEM AND METHOD FOR PLAYING A ROLE-PLAYING GAME

RELATED APPLICATION

This application claims priority under 35 U.S.C. §119(e) to U.S. Provisional Application Ser. No. 60/574,144 entitled "SYSTEM AND METHOD FOR PLAYING A ROLE-PLAYING GAME," filed on May 25, 2004, and this application is herein incorporated by reference in its entirety.

FIELD OF THE INVENTION

The present invention relates generally to games that can be played on a computer, and more particularly, to role-playing games.

BACKGROUND

Role-playing games (or RPGs) originated in interactive literature and became popular in the form of tabletop role playing games. Such games have developed into computer games, many of which were originally single-player text-based games. Computer-based role playing games have developed over the years, adding graphics, multiplayer capabilities, and other features.

Computer role playing games are distinguished from other computer adventure games primarily by the player being allowed to create a character or a group of characters by choosing ability scores, equipment and other attributes, similar to a character generation process that takes place in traditional tabletop role playing games. Unlike tabletop role playing games, however, computer role playing games largely remain a single-player experience or have limited multiple player capabilities. Like other kinds of computer adventure games, success is achieved by finding a correct path through the pre-programmed obstacles and hazards. Several conventional computer role-playing games include, for example, role-playing games from Strategic Simulations, Inc. (SSI) based on the popular Advanced Dungeons & Dragons tabletop role-playing games available from TSR, Inc., Ultima Series role-playing games available from Origin Systems, and more recently the Diablo role-playing game available from Blizzard Entertainment.

Multi-user computer role playing games are known by a variety of acronyms, which normally indicate stylistic rather than technical differences. The majority of these games fall into two broad categories. Multi-User Dungeons (or MUDs) type games favor action and combat, with players fighting monsters and even other players in the effort to become more powerful. By contrast, games of a Multi-User Shared Hallucination (MUSH) or Multi-User Shared Environment (MUSE) type place more emphasis on nonviolent interaction between players. In these game types, some game sessions become intensely political as players plot and compete for influence, while others are closer to group storytelling than to a competitive game.

Apart from the shared characteristics of supporting multiple players over a network or the Internet, and allowing each player a single game persona or character, features of these types of games are various. For instance, some games are entirely human-moderated, and others are computer-moderated to varying degrees. Some are entirely text-based, and some use graphics and sound to varying degrees. A list of example MUDs and other similar games may be found in the USENET newsgroup rec.games.mud.misc.

SUMMARY

One aspect of the present invention relates to role playing games that can be adapted to a wagering game of skill and chance. Traditionally, role playing games are for entertainment, and are not associated with wagering. In another aspect of the present invention, one or more players compete against each other or the computer to win prizes. These prizes may be awarded for achieving intermediate goals within a game session, or an overall goal of an individual game session. Other prizes may be awarded to the player that achieves an ultimate goal among a number of game sessions, such as being the sole survivor of the game.

In one example game format, players compete against one another to become the sole survivor of the game. More particularly, players may eliminate one or more other players from the game. In another example, a first player is awarded points associated with a second player when the first player eliminates the second player from the game. In this manner, players accrue points by eliminating other players, but in so doing, the player increases his/her worth. According to another aspect of the present invention, players are eliminated from the game by eliminating other players in a combat environment.

According to another aspect of the invention, a player competes in a number of game sessions against one or more players. In yet another aspect, the player subscribes to multiple game sessions by paying a subscription fee to a gaming operator. For instance, the player may subscribe to multiple sessions in a jurisdiction that permits gambling such as a casino. In another aspect, the player is permitted to play the role playing game outside a jurisdiction that permits gambling (e.g., on a computer coupled to the Internet). Players may also be permitted to place wagers on the outcome of individual game sessions, other players, the overall outcome of the game, or other aspects of game play.

According to one aspect of the present invention, a method of conducting a role playing game is provided. The method comprises acts of providing for an entry of at least one of the plurality of players into at least one session of the role playing game, accepting payment for an entry fee by the at least one of the plurality of players, the entry fee being associated with the at least one session of the role playing game, and determining a player who wins a prize among the plurality of players playing in the at least one game session of the role playing game. According to one embodiment of the present invention, the role playing game is conducted using one or more computer systems. According to another embodiment of the present invention, the act of determining the player who wins a prize includes an act of determining a sole survivor among the plurality of players that play the role playing game. According to another embodiment of the present invention, the method further comprises an act of conducting the role playing game including an act of permitting fighting between at least two of the plurality of players. According to another embodiment of the present invention, the prize is a monetary prize.

According to one embodiment of the present invention, the act of providing the entry includes an act of subscribing the at least one of the plurality of players to a plurality of sessions of the role playing game. According to another embodiment of the present invention, the at least one of the plurality of players pays a subscription fee associated with the plurality of sessions of the role playing game with at least one of money, credit, debit, and loyalty program credit. According to one embodiment of the present invention, the method further comprises an act of accepting at least one wager placed on the at least one of the plurality of players, the at least one wager being a winning wager if the at least one of the plurality of players wins the at least one game session. According to one embodiment of the present invention, the method further comprises an act of accepting at least one wager placed on the at least one of the plurality of players, the at least one wager being a winning wager if the at least one of the plurality of players wins a plurality of game sessions of the role playing game.

According to one embodiment of the present invention, the role playing game comprises a plurality of game sessions and wherein the act of determining a player who wins a prize includes an act of determining a player that achieves the most points of any player that plays in the plurality of game sessions of the role playing game. According to one embodiment of the present invention, the act of providing for an entry of the at least one of the plurality of players into the at least one session of the role playing game comprises an act of providing for an entry of the at least one of the plurality of players in a plurality of game sessions of the role playing game. According to one embodiment of the present invention, the act of providing for an entry of the at least one of the plurality of players in a plurality of game sessions is performed within a jurisdiction that permits gambling. According to another embodiment of the present invention, the at least one of the plurality of players is permitted to view at least one of the plurality of game sessions in an interface located outside of a jurisdiction that permits gambling.

According to one embodiment of the present invention, the method further comprises an act of permitting the at least one player to purchase ammo for use in the at least one session of the role playing game. According to one embodiment of the present invention, the method further comprises an act of crediting another one of the plurality of players with points accrued by the at least one player if the another one of the plurality of players eliminates the at least one player from the at least one session of the role playing game. According to one embodiment of the present invention the method further comprises an act of permitting the at least one player to enter a tournament including a plurality of role playing game sessions, and collecting, from the at least one player, an entry fee for entering the tournament. According to one embodiment of the present invention, the method further comprises an act of permitting at least one user to place a wager on an outcome of the role playing game.

According to another embodiment of the present invention, the act of providing an entry includes an act of entering a player into the at least one game session of the role playing game. According to another embodiment of the present invention, an act of receiving an entry fee from the player before the player enters the at least one game session of the role playing game. According to another embodiment of the present invention, the act of determining the player who wins a prize among the plurality of players further comprises an act of determining which of the players has accumulated the highest number of points in the at least one session of the role playing game. According to another embodiment of the present invention, the role playing game comprises a plurality of game sessions of the role playing game, and wherein the act of determining the player who wins a prize among the plurality of players further comprises an act of determining which of the plurality of players has accumulated the highest number of points in the plurality of game sessions of the role playing game. According to another embodiment of the present invention, the method further comprises an act of conducting the game session, the act of conducting the game session comprising an act of providing ammunition for the at least one player to eliminate one or more other players from the at least one game session.

According to one embodiment of the present invention, the method further comprises an act of conducting the game session. The act of conducting the game session comprises acts of accumulating, for the at least one player, an indicator identifying a worth of the at least one player, and increasing the indicator when the at least one player eliminates one or more other players from the at least one game session of the role playing game. According to one embodiment of the present invention, the act of conducting the game session further comprises an act of increasing the indicator of the worth of the at least one player by an amount indicated by an indicator of a worth of at least one other player when the at least one player eliminates the at least one other player from the at least one game session of the role playing game. According to one embodiment of the present invention, the method further comprises an act of determining at least one of the plurality of players that has accumulated a highest indicator of worth from among the plurality of players. According to another embodiment of the present invention, the act of determining the at least one of the plurality of players that has accumulated a highest indicator of worth is performed at the end of the at least one game session of the role playing game.

According to one embodiment of the present invention, the game session is conducted within a predetermined period of time. According to one embodiment of the present invention, the act of conducting the game session further comprises an act of attributing, to the at least one player upon entering the at least one game session, an immortal status. According to another embodiment of the present invention, the act of attributing an immortal status to the at least one player is performed over a finite period of time upon entering the game session of the role playing game. According to yet another embodiment of the present invention, the act of conducting the game further comprises an act of prohibiting more experienced players from eliminating at least one new player entering the at least one game session of the role playing game.

The function and advantage of these and other embodiments of the present invention will be more fully understood from the examples described below. The following examples are intended to illustrate the benefits of the present invention, but do not exemplify the full scope of the invention.

BRIEF DESCRIPTION OF THE DRAWINGS

The accompanying drawings are not intended to be drawn to scale. In the drawings, each identical or nearly identical component that is illustrated in various figures is represented by a line numeral. For purposes of clarity, not every component may be labeled in every drawing.

In the drawings.

DETAILED DESCRIPTION

Figure 1:
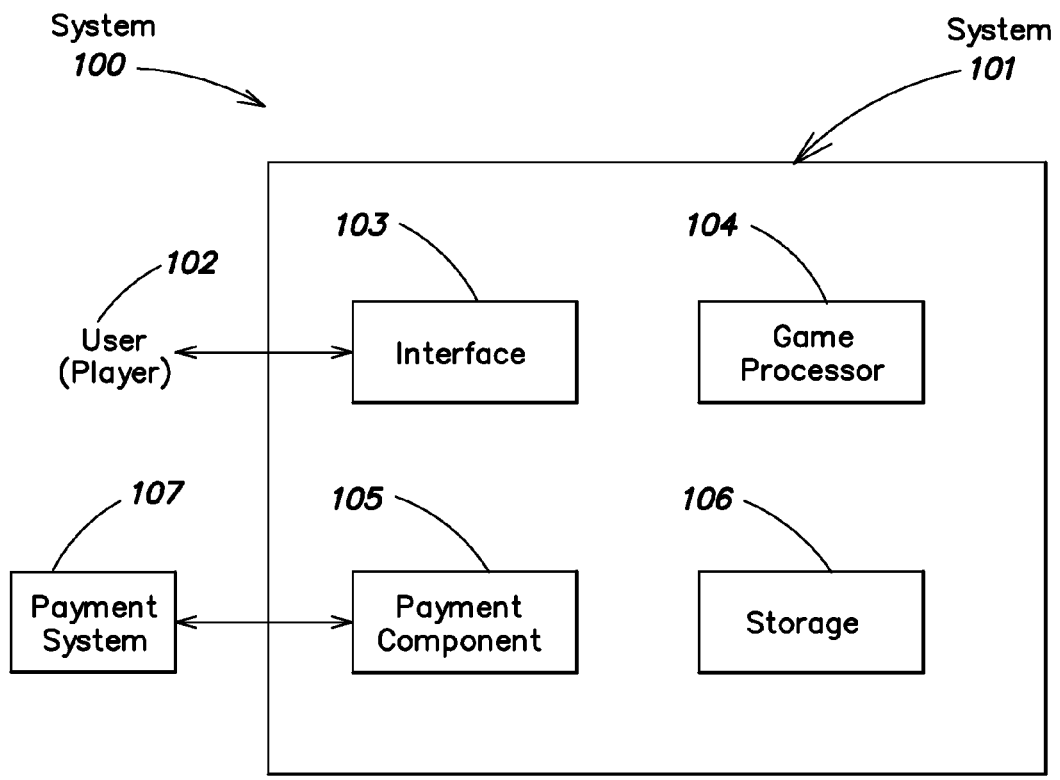
FIG. 1 shows a system for playing a role-playing game according to one embodiment of the present invention.

One aspect of the present invention relates to a role-playing game that is adapted to a wagering game of skill and chance. In such a game, players compete against each other to win one or more prizes. In one example, a player that is the sole survivor of a number of game sessions wins a prize. For instance, players subscribe to a number of game sessions in order to compete to be the last player standing. In one such game format, players eliminate other players to become the last person standing in the game.

In one such game format, players will eliminate (e.g., by killing) other players or will be eliminated (e.g., killed) from a series of multiple game sessions. In another example game format, each player has a "price" associated with that player. When "killed" or otherwise eliminated from the game, the player that kills or otherwise eliminates a particular player receives the price of that player (e.g., as measured in points). Players may therefore accumulate points by eliminating (e.g., by killing) other players. In one example, the game has a predetermined length (e.g., time, number of game sessions, etc.), and the player having the most points at the end of the game wins a prize.

However, as a player accumulates points by eliminating other players, the price (e.g., a bounty) on his/her head increases, and it follows that the player's worth to other players increases. Thus, it may become more difficult as the game progresses for players having large bounties to survive in the game, as they become more valuable to other players. In another example, players may collaborate on eliminating other players and may split the points associated with eliminating those players. Players may form alliances with other players, at least until they are in a position where they must eliminate each other to advance in the game.

According to one embodiment, players who initially subscribe to the game may be allowed a brief introductory period into the role-playing game where they are designated as being "immortal" (e.g., the player cannot be eliminated from the game). Such an immortal status may be attributed to a new player so that the new player may be acclimated to the game environment (e.g., to learn rules, playing tricks, and other skills). Further, such a designation may be beneficial to prevent more experienced players from congregating at entry points of the game and eliminating new players as they emerge into the game.

In another embodiment, a player is assigned an initial number of ammunition (e.g., bullets), but may purchase additional ammunition from the gaming operator for an additional fee. In yet another example game format, the gaming operator may collect additional fees by charging a tournament entry fee above and beyond a player's separate contribution to a prize pool. In one example, the prize pool may be funded by subscription fees received from the players to play the game. Further, the game operator may generate additional revenue by taking bets from players or other bettors on outcomes. These wagers may be, for example, wagers on the outcome of individual game sessions, other players, the overall outcome of the game, or other aspects of game play.

FIG. 1 shows a block diagram of an example system for operating a plurality of game sessions in accordance with one embodiment of the present invention. System 100 includes a system, which may be, for example, a computer system as described below with reference to FIG. 2, for conducting a role-playing game. System 100 may employ one or more general-purpose computer systems as discussed below with reference to FIG. 6.

System 101 includes an interface 103 that interacts with a user (e.g., a player) 102 to play a role-playing game, place wagers and communicate information relating to a game session. Interface 103 may be, for example, an interface of a computer system. For example, interface 103 may include a computer-generated interface presented by a browser program operating in a memory of a computer system. Although a browser-based interface could be used, it should be appreciated that any type of interface may be used, and that the invention is not limited to any particular interface type.

System 100 may also include a game processor 104 that performs functions relating to conducting the role-playing game and any other functions related to the game. For example, processor 104 may receive and process bets placed by users through interface 103, conduct game sessions and rules of the role playing game, and determine wins and payouts to players. Game processor 104 may be, for example, one or more computer processes executing in a memory of system 101.

Information relating to game sessions may be stored in one or more storage entities 106 associated with system 101. In one example, storage 106 may include one or more storage devices such as a disk. However, it should be appreciated that storage 106 may include any entity capable of storing data, and the invention is not limited to any particular storage entity. Storage 106 may, for example, store information directly relating to game play (e.g., a number of players, current score, health status of the player, current state of game play) or other information relating to game play and payment.

System 101 may include a payment component 105 that receives payment information from a user 102. Payment information may be entered by a user 102 manually through interface 103. Payments may include, for example, subscription fees to play one or more game sessions, bets placed by the player, or other payments. Bets placed by a player may include, for example, wagers placed by players or any additional bets (e.g., tournament entry fees) paid by a player in association with playing a game. Payment component 105 may communicate with one or more payment systems 107 for the purpose of obtaining payment for playing the game.

Prior to a game session, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos.

The game player may pay in person (e.g., by using a cashier in a casino) or through other remote methods including a telephone, a cell-phone, a handheld device (e.g., a PDA), a kiosk, a computer coupled through the Internet or other network, a set top box, and mail. Payment may be made in any form that is legal in the particular jurisdiction.

In one embodiment of the invention, players may subscribe to play multiple consecutive game sessions. That is, a player may pay at one time to play more than one game. According to one embodiment, such a player may subscribe to multiple games using any payment method described above. These subscribed games may be automatically played, for example, by a computer system. In another embodiment, a player may also choose to have his or her subscription automatically renewed.

According to one embodiment of the invention, players may also enter to play this or any other wagering game of chance using an alternative method of entry (AMOE). AMOE is a required available method of entry that does not require a purchase to enter a sweepstake; sweepstakes are usually used as a promotional or marketing tool. An individual entering a sweepstakes by AMOE is required by law to have the same odds of winning each of the available prizes.

A common AMOE method includes requiring an individual interested in entering the sweepstakes send in a postcard with his or her name, address or other contact information. Another AMOE method includes requiring an individual to sign on to a free Internet website and to submit the required information for free. Numerous other methods may be used for performing AMOE. Most sweepstakes limit the number of times one individual or family may enter a sweepstakes by AMOE.

According to one embodiment of the invention, it is realized that an AMOE (alternative method of entry) may be used to enter a game of skill or chance. More particularly, it is possible to develop, implement and run wagering games of skill or chance, including the inventive games described herein, with an AMOE method of entry. AMOE methods are conventionally used to enter a player in a sweepstakes, which is not considered wagering or gambling. Thus, according to one embodiment of the invention, an individual may enter the wagering game of skill or chance by AMOE using, for example, the postcard or the online method outlined above. The wagering game of skill or chance player entering by AMOE may also have the same odds to win the payout associated with the game in which they are entered.

The wagering game of skill or chance player entering by AMOE may also be limited to a small number of games within a given period of time. For example, a player entering by AMOE may be limited to entering one game in one year or two games in one month. Other numbers of game sessions and given periods may be any number, and the invention is not limited to any particular implementation.

According to one embodiment, the game that the game player entering by AMOE is entered into may be determined by the game player on an AMOE entry form. For example, the postcard AMOE may be required to state the date and the time of the game that the game player wants to enter. Alternatively, the game entered may be the next starting game after the AMOE is received and logged. As another alternative, AMOE entries may be assigned to a specific game(s) each hour, day, week or other time interval.

A gaming operator may collect revenue for operating the game by one or more methods. In one example, the gaming operator collects and retains a portion of an entry fee from each player, the portion being an amount over that which is retained by the gaming operator to pay out prizes. The entry fee may be, for example, a fee paid for a single game, a fee for entry in a series of games (e.g., a subscription), or an entry fee associated with a tournament.

Further, the gaming operator may generate revenue by accepting bets waged by a player or other person (e.g., a person viewing the game) on an outcome of the game. For instance, a player may bet on whether another player will be the last person standing in the game, whether the player will achieve a particular point total, whether another player will be eliminated from the game (e.g., "killed" within a particular time period or number of game sessions) or other outcome. The gaming operator may calculate odds of a particular outcome, and determine a payment on that basis. In another example, the payout may also not be directly related to the odds for a particular outcome.

According to one embodiment, a game includes predetermined prize levels associated with the game. In one specific example, prize levels may be increased as a player progresses further in the game. For instance, each game level may have a corresponding prize that increases as the game level is increased. Prize levels may also have adjustments for a player's subscription. For instance, the prize levels may increase if the player purchased a multiple game subscription having a high payment per game. Prize levels may also be adjusted for numerous other criterion including, but not limited to, frequent player credits. Of course, prize level may be adjusted to meet any legal requirements for the gaming jurisdiction in which the game is played.

The prize levels for each game may also be supplemented by a jackpot that transfers from game session to game session. These types of jackpots are commonly referred to as rolling or progressive jackpots. A rolling jackpot may be, for example, the same amount that transfers from game to game until the jackpot is paid out. A progressive jackpot is a rolling jackpot that increases as more games, game cards or other criterion are played.

The final prize level may also be affected by bonus play, which is well known in the gaming industry. Bonus play works to increase some payouts by offering the chance to multiply a payout.

One or more games may proceed concurrently. Parameters of concurrent games may be the same, similar, or different. Additionally, games may run continually, i.e. one after another. When one game ends, another game may begin immediately or in a short period of time. Game sessions may follow a precise time schedule so that players know when game will begin. For example, if game play in a game requires four and a half (4.5) minutes to complete, then the next game may start immediately (or after a delay, e.g., thirty seconds) to keep to a schedule of games every five minutes (e.g., at :00, :05, :10, :15, :20, :25, :30, :35, :40, :45, :50, :55 of each hour). It should be appreciated that any length or number of game sessions may be used, and the invention is not limited to any particular length or number of game sessions. Because game sessions may run continually, it may be possible that a particular game session will have no game player playing within the particular game session.

In one embodiment, the computer system may display the game(s) or the identity of the game player(s) closest to winning to all game players during the game session. The computer system may also choose to display only one or a subset of all the game sessions or identities of players closest to winning to a particular game player playing or observing the game session.

In one embodiment, the computer system may notify all game players playing the game session that a win has occurred. Additionally, the computer system may display the winning game, the winning player's identity, the payout and/or prize awarded to the winning player.

During the period of time between the games, a game operator may make announcements, rest, or any number of actions. If the game is played using a computer system, advertisements, sponsorships, public service announcements or any visual or auditory content may be inserted into these periods. Advertisements and any other content may also be inserted into the game display during a game session.

In one embodiment of the present invention, game sessions and game play are partially or fully automated and monitored using one or more computer systems. A computer system may be a single computer that may be a single computer capable of executing one or more functions of a game. For instance, the computer may be a supercomputer, minicomputer, mainframe or personal computer. A computer system used to run a game and its associated sessions may include a combination of one or more computer systems (of one or more computer system types) that cooperate to accomplish system-level tasks. The computer system also may include input or output devices, displays, or storage units. It should be appreciated that any computer system or systems may be used to execute a game, and the invention is not limited to any number, type or configuration of computer systems.

Figure 2:
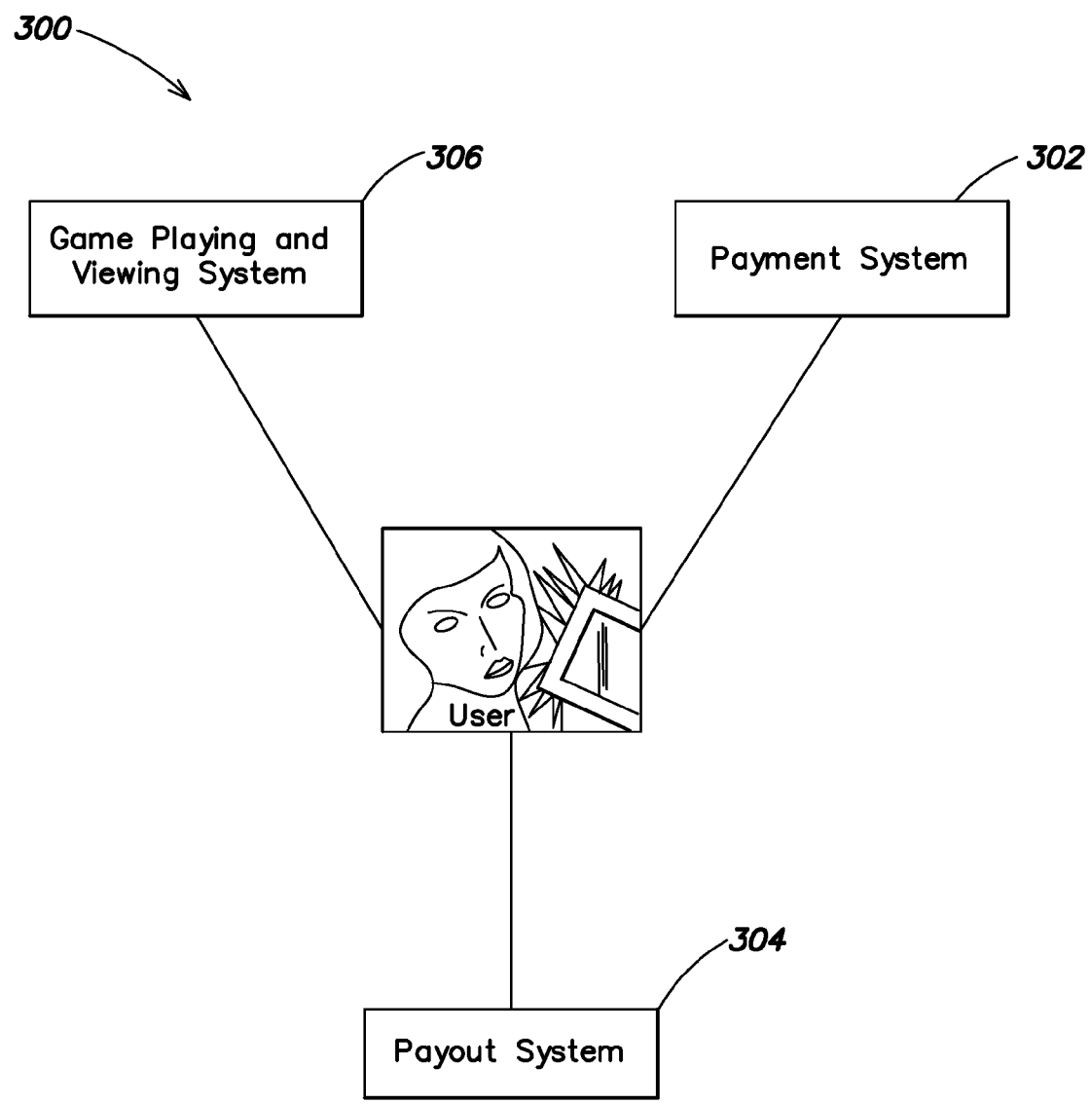
FIG. 2 shows components of a game-playing computer system according to one embodiment of the present invention.
Figure 3:
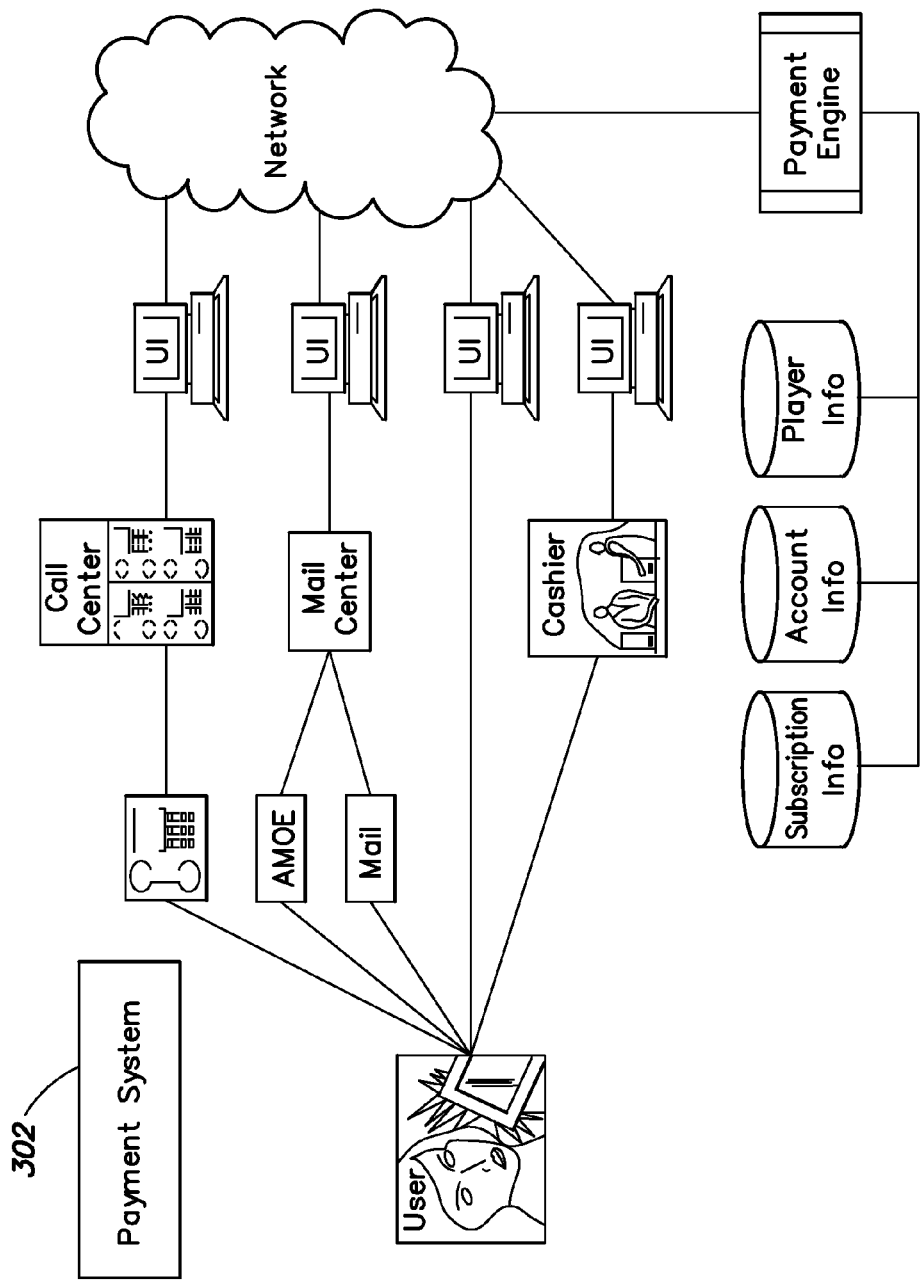
FIG. 3 shows components of a game payment subsystem according to one embodiment of the present invention.

A computer system (e.g., system 300) game according to various embodiments of the present invention may include, for example, one or more system components that perform specific functions as shown in FIG. 2. One system (e.g., payment system 302) may handle payment, subscription and/or AMOE by players to enter the game. Another system (e.g., system 306) may handle playing and viewing the game. Yet another system (e.g., system 304) may handle payouts to winning players. System 300 may also be connected by direct line or network to other computer systems including systems for handling casino or hotel loyalty programs, reservations, in-room television viewing or gambling floor kiosks. Connections to other computer systems may be performed using one or more of the system components described below.

Figure 4:
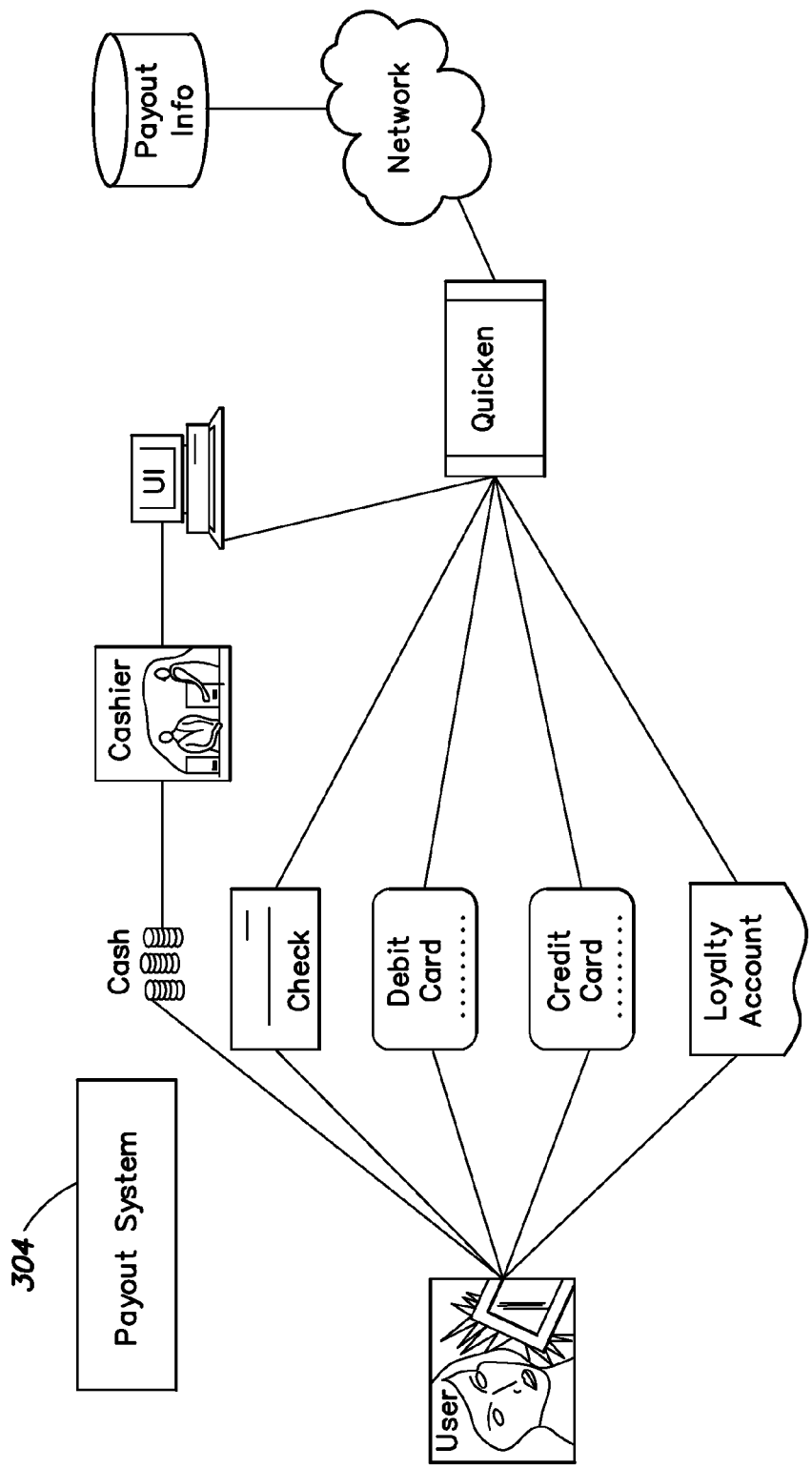
FIG. 4 shows components of a game payout subsystem according to one embodiment of the present invention.

A payment component (e.g., payment system 302) may include one or more of a number of well-known systems as shown with more particularity in FIG. 4. For example, a player may be able to pay to play one or more games by using a telephone and by speaking with a call center representative who inputs player, payment, and subscription information into a computer using a user interface. In the computer, data may manually be stored in a data structure that is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Player information may also be entered into the system by a payment system component (e.g., item 302). Player information that may be input may include the player's name, address, telephone number, and age. Payment information associated with the player may include credit or debit card number or loyalty account information. Subscription information for games to which the player subscribes may include first game date and time, number of games to play, and bet per game. Based upon the payment and subscription information, the call center representative may then verify that the payment information is valid and enough credit or funds is available for the player's desired subscription.

A similar system may be used for players entering using the mail or a postcard AMOE except the call center may be replaced by a mail center with representatives entering information into a computer via a user interface. For example, a cashier that works at a casino directly with players that pay cash or credit to play, may also have the ability to input player, account, and subscription information using a user interface of a computer system.

Computer systems or pay engines for handling electronic or online payment and subscriptions may also be used. Such systems are well-known, and include such systems as PayPal, iKobo, VeriSign, and other systems. Using such a system, a player interacts directly with a user interface to input information into a payment data structure that may be transferred to one or more payment systems (e.g., PayPal).

Various pay systems and one or more user interfaces may be located on one or more computer systems coupled by a network with the computer system(s) containing the player, account, and subscription database(s). As used herein, a "network" or a "communications network" is a group of two or more devices interconnected by one or more segments of transmission media on which communications may be exchanged between the devices.

The above are merely an illustrative embodiment of a payment system component. It should be appreciated that such an illustrative embodiment is not intended to limit the scope of the invention, as any of numerous other implementations of a payment system component, for example, variations of online payment, are possible and are intended to fall within the scope of the invention. For example, the payment system component may include using pay-per-view systems associated with interactive television or the pay engine may additionally deliver a receipt to the player by either e-mail or mail. None of the claims set forth below are intended to be limited to any particular implementation of the pay system unless such claim includes a limitation explicitly reciting a particular implementation.

According to another embodiment of the invention, the system may include a payout system component such as that shown in FIG. 4. As shown, system 304 may include one or more components for submitting payment to a player. Any of a number of standard systems or payout engines for making payouts for winning may be used. For example, a standard application programming interface such as 'Quicken' (Intuit Inc., Mountain View, Calif., USA) may be used to write and mail checks or credit a debit card, credit card (if legal in the jurisdiction of play), or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of a payout system that may be used to make payouts to players. Such an illustrative embodiment is not intended to limit the scope of the invention, as any of numerous other implementations of the payout system, for example, variations of online payout, are possible and are intended to fall within the scope of the invention.

Additionally, a cashier may also have access to payout information using a user interface to the payout data structure through a network. The cashier then makes a payment to the winning player based upon the accessed information. None of the claims set forth below are intended to be limited to any particular implementation of the pay system unless such claim includes a limitation explicitly reciting a particular implementation.

Figure 5:
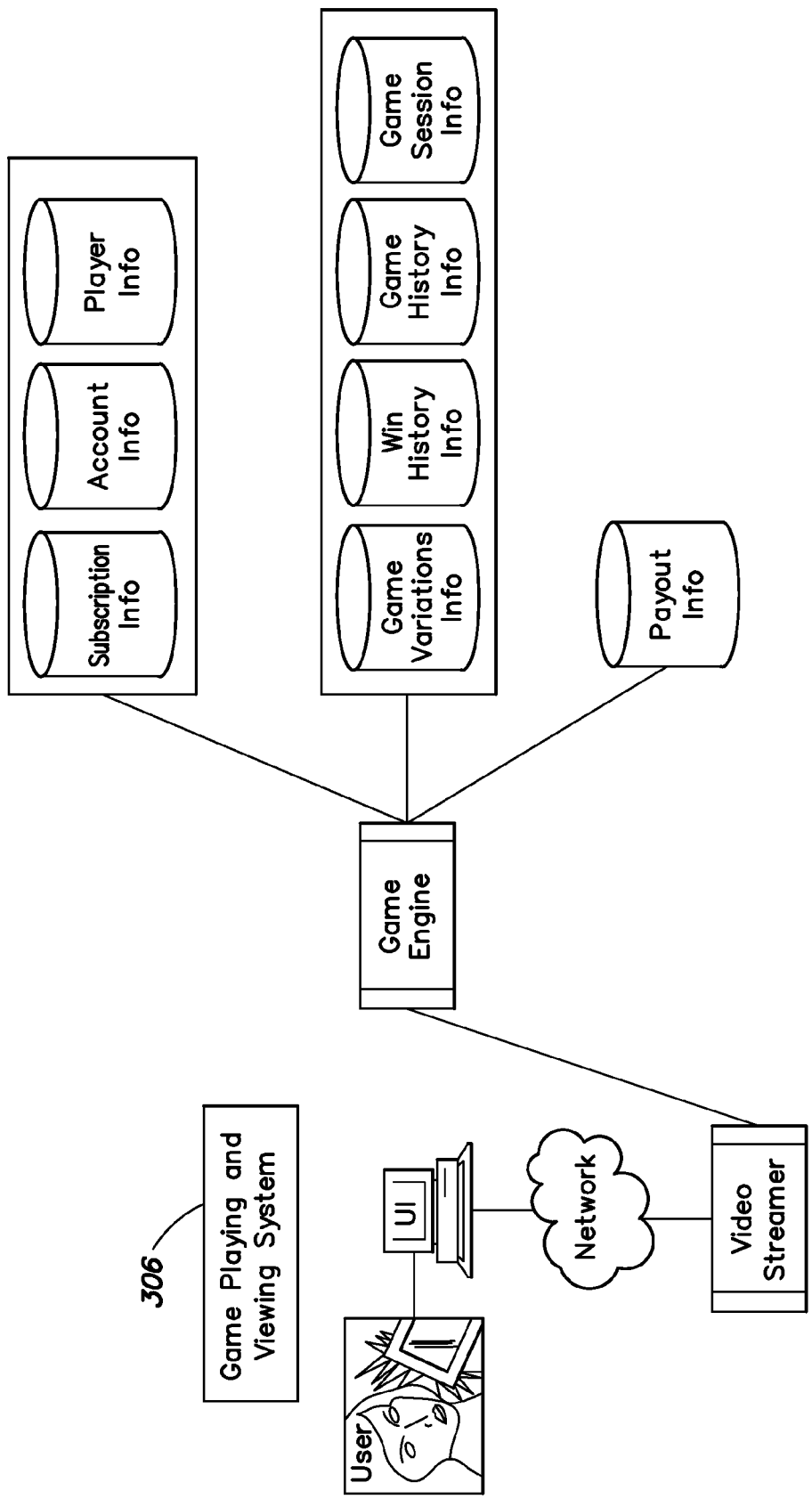
FIG. 5 shows components of a game playing and viewing subsystem according to one embodiment of the present invention.

A game playing and viewing system (e.g., system 306) may include one or more components for performing specific functions as shown in FIG. 5). Components may include, for example, storage components that store data structures that include information relating to storing game variations, present game information, game history, and/or win history. A game playing and viewing system (e.g., system 306) may also include components used to access payment and payout data structures.

Figure 8:
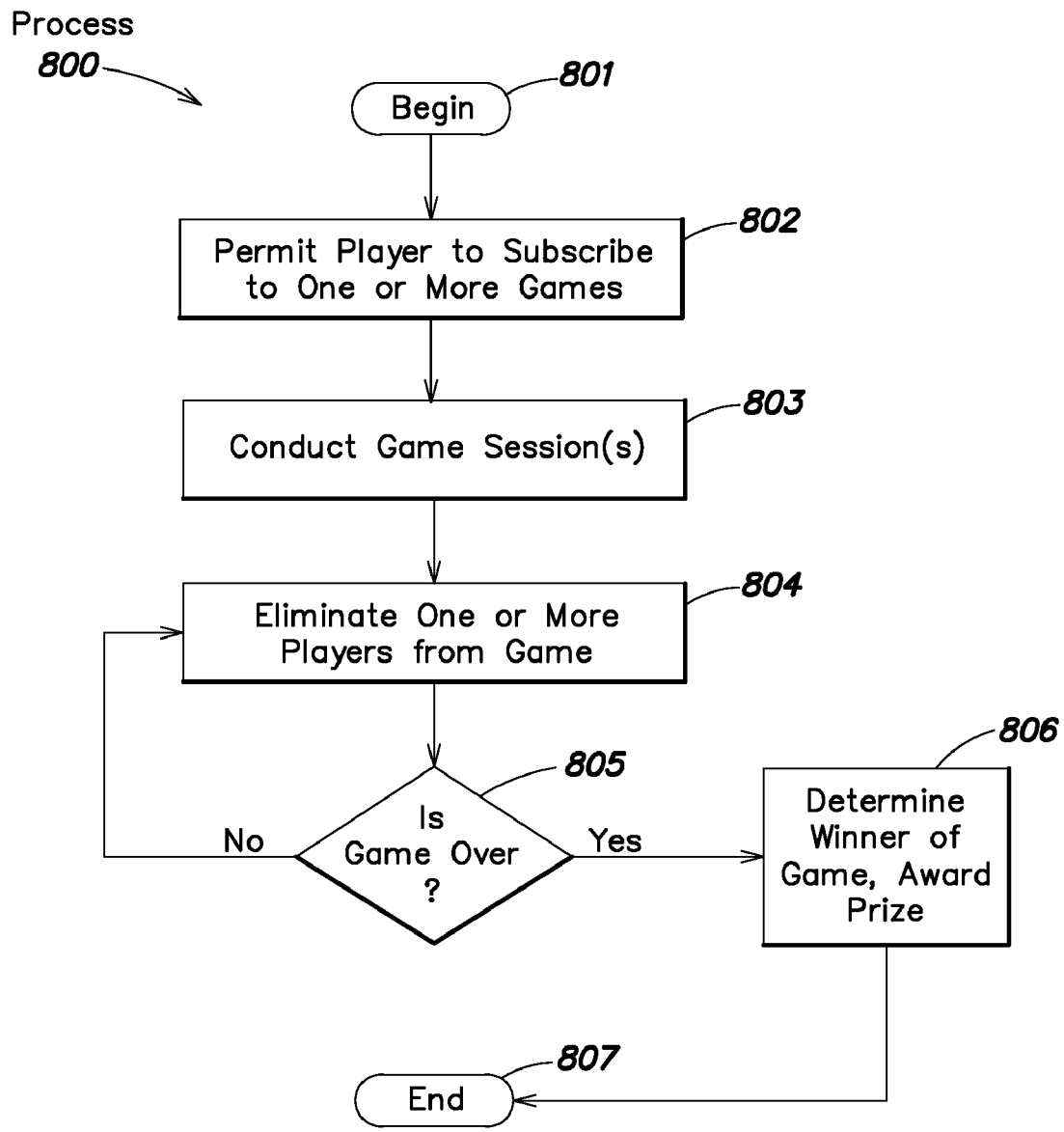
FIG. 8 shows a process for conducting a role-playing game according to one embodiment of the present invention.

A game playing and viewing system according to one embodiment may also include a game engine. A game engine may perform functions relating to conducting a game session of a role playing game. In one example, a game engine may perform functions associated with a process 800 for conducting a role-playing game as shown in FIG. 8. A player may play one or more game sessions in an associated interface of a computer system, with the computer presenting, in the associated interface, a role playing game to the player.

As shown in FIG. 8, a process 800 for conducting a role-playing game may be performed. At block 801, process 800 begins. One or more systems that conduct the role playing game may permit a player to subscribe to one or more games at block 802. This may be performed, for example, by a game engine component as discussed above. The player, for instance, may be permitted to subscribe to one or more sessions of a role playing game. These sessions may be played at some point in the future (e.g., in a casino, on a computer, etc.), and may or may not be played within a legal gambling jurisdiction.

At block 803, the computer system(s) conduct one or more game sessions. These sessions may be any type of role playing game as discussed above. They may, according to one embodiment, allow the user to carry over their progress (e.g., achieved points) to later game sessions.

As discussed above, one or more of the game sessions may be a survival game wherein players eliminate other players (e.g., at block 804). This elimination may be performed, for example, by allowing combat between the players. Players may be attributed some parameter (e.g., health) that, when exhausted, indicates that the player is eliminated from the game session. The parameter may be increased, for example, when the player achieves a particular status in the game (e.g., collects a token that increases health). However, in one example, when a particular player's health is exhausted, that player is eliminated from the game. The computer system may determine whether the player is eliminated.

At block 805, the computer system(s) conducting the one or more game sessions may determine whether the game is over. If the game is indicated as being over, one or more winners of the game may determined, and one or more prizes awarded at block 806. If not, the game continues, and one or more players are eliminated from the game. As discussed above, the game may be indicated as being over when there is a single player remaining (e.g., the sole survivor of the game). Alternatively, the game may be indicated as being over when a finite playing period has expired or a number of game sessions have been reached. Any method for determining the end of the game may be used, and the invention is not limited to any particular method. At block 807, process 800 ends.

Figure 9:
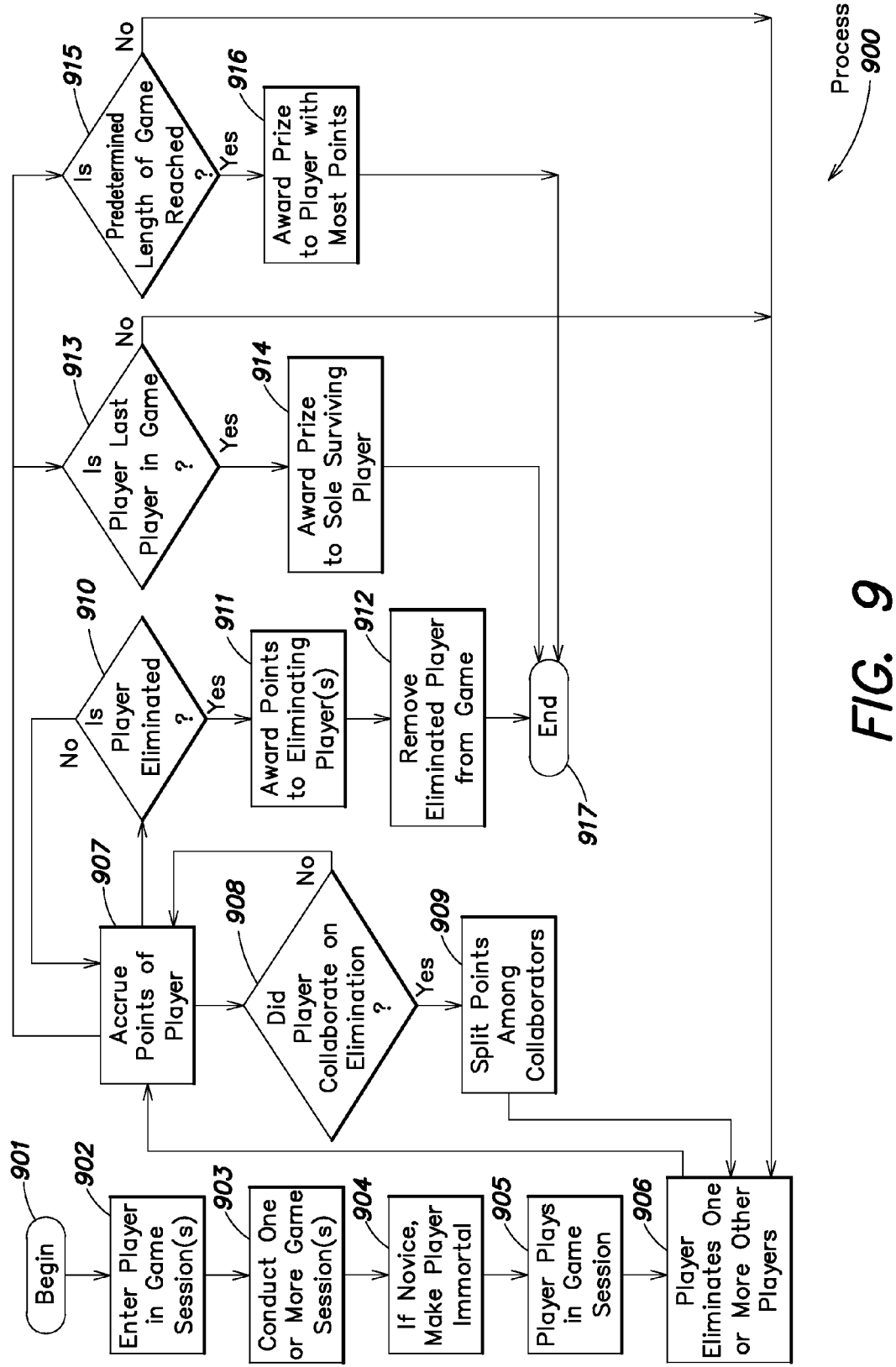
FIG. 9 shows another process for conducting a role-playing game according to another embodiment of the present invention.

FIG. 9 shows another example process 900 for conducting a role-playing game according to one embodiment of the present invention. At block 901, process 900 begins. At block 902, a player is entered into one or more game sessions of the role playing game. For instance, the player may be permitted to purchase a subscription for playing multiple game sessions of the role playing game. For example, the role playing game may be played weekly, daily, or other frequency after the subscription has been purchased.

At block 903, one or more computer systems conduct the game session. As more fully described below, a player may play one or more sessions of the role playing game using an interface of a computer system (e.g., a personal computer) that is coupled to one or more computer systems controlled by a gaming operator. These computer systems may be coupled, for example, through a communication network such as the Internet.

The gaming operator controls functions (either automatically or manually) performed by the computer systems, and is responsible for distributing payouts, accepting subscription fees, side wagers, and other functions associated with conducting the role playing game. At block 903, one or more players are entered into one or more game sessions conducted by one or more computer systems, after which the player(s) may begin to play a game.

As an option, the gaming operator may permit one or more players to try the game for a finite period (e.g., an evaluation or trial period), and this trial period may not necessarily require subscription fees, wagers, or other expense to be incurred by the player. Another option may involve attributing a novice status to a playing "piece" or representation of a player (e.g., an avatar) in the role playing game. This novice status may provide some player advantages in playing the game.

In one example, the player is provided an "immortal" status that prohibits other players from eliminating the player from the game. Novice status may be awarded, for example, to novice players (e.g., at block 904) that require an introduction to the game. In one example, an immortal status prohibits, for example, more expert players from eliminating novice players from the game.

The novice status of a player may be removed, for example, after the player plays the game for a period of time, after a player achieves a particular point total or rating, or other criteria. Further, a player having a novice player status may have reduced functionality within the game. For example, a novice player may not be eligible to win prizes, may be awarded reduced points for eliminating other players, or may have other restrictions placed on playing the game. Although a novice (e.g., an immortal) status may be attributed to a player, it should be appreciated that other types of temporary statuses may be attributed to the player according to one embodiment of the invention. Such temporary statuses may afford the player any number of increased or decreased capabilities during play within a particular game session.

At block 905, the player begins playing in at least one of the game sessions, and at block 906, the player eliminates one or more players from the game. The player accrues points (e.g., at block 907) by eliminating other players from the game. In one example, points of the eliminated player(s) are distributed among the eliminating players if and when the player is eliminated from the game by the other players.

Elimination of a player may be performed by another player, the role-playing environment, or other method. In one example, players are permitted to collaborate on eliminations of other players and split the points attributed to those eliminated players. More particularly, a game engine component of one or more computer systems conducting the game may determine whether players collaborated on a particular elimination of a player (e.g., at block 908), and if so, the points associated with the eliminated player may be split among the eliminating players. The points may be split evenly or unevenly among the eliminating players as determined by the collaborating players or as determined by the computer gaming system. Collaboration to eliminate a player(s) may be declared by the collaborating players in advance or may be determined by the computer gaming system based upon the game play.

At block 910, it is determined whether a player is eliminated from a game session (or from the overall game). This may be accomplished as discussed above, for example, with reference to FIG. 8 by associating some parameter with each player, that, when exhausted, indicates that the player is eliminated from the game. If a player is eliminated, his/her associated points are awarded to the eliminating player(s) at block 911. At block 912, the eliminated player is removed from the game. Removing the player from the game may involve, for example, removing a representation of the player from the game, indicating to other players that the eliminated player has been removed, and/or other actions. For the eliminated player, the game is ended. For games as part of a multi-session game, the eliminated player may be eliminated from playing in any remaining game sessions. Play continues for the surviving players.

At block 913, it is determined whether the player is the last surviving player in the game. If so, the surviving player may be awarded a prize (e.g., at block 914). If not, the player continues to eliminate other players at block 906. This prize may be, for example, in any one of the forms discussed above.

According to one aspect of the present invention, it is realized that, especially with wagering games, it is difficult to keep a player playing the game. However, according to one embodiment of the invention, the prize may be a relatively large prize as compared to any intermediate prizes awarded to the player during the game. In this manner, the player is encouraged to keep playing the game, even though he/she may have a lower point total than other players. Also, there is a chance that other players having higher point totals may be eliminated, and that the player may become the sole surviving player. The gaming operator may receive additional revenue, for example, from side bets placed by players, allowing players to purchase additional ammo, health, weapons, strength, or any other item, and other methods. Because the player is provided additional incentive to stay in and compete in the game, player interest is maintained and additional revenue is generated as a result.

At block 915, it is determined whether a predetermined length of the game is reached, and if so, a prize may be awarded to a player having accrued the most points or other measurement method for measuring the player's progress in the game. If not, the player is permitted to continue to eliminate other players at block 906. At block 917, process 900 ends.

As discussed above, there may some constraint placed on the game, such as a limited time period, number of sessions, etc. that a particular game may be held. Such a constraint may be beneficial in the case when players are eliminated from a particular game with a large prize pool, but are not encouraged from starting new games having lower prize pools. According to one embodiment, a series of games may be offered by a gaming operator that begin at multiple times, allowing a player to enter a game (having multiple game sessions) at various points to increase participation in the game.

If the player is determined to be a winner at block 916, then the computer may proceed to notify the player that he or she is a winner. Further, the computer may determine the payout and notify the winning player of the payout amount. The computer may also display the winning game and/or player information to all the game players. Winning player information that may be displayed may include, for example, the winning player's name, city, state and country. If multiple winners occur simultaneously, all winners or winning games may be displayed at one time or sequentially. It may also be possible that winners or winning games may be selectively displayed to game players. For instance, if numerous winners occur at one time, a player in Bismarck, N. Dak. may be shown only the winning player information or game that occurred closest to him or her, say in Pierre, S. Dak. versus some other location (e.g., Boston, Mass.).

If it is determined that there are no winners, the computer may determine whether the player is the closest to winning after the game is found not to have a winner. Any of a number of criteria may be used for determining the player closest to winning. For example, the player having the highest point total or greatest strength may be closest to winning.

Although shown by way of example, game play processes 800, 900 may include more or less acts. Further, the order of the acts performed as part of processes 800, 900 are not limited to the order illustrated in FIGS. 8 and 9, as the acts may be performed in other orders, and one or more of the acts of processes 800, 900 may be performed in series or in parallel to one or more other acts, or parts thereof.

Processes 800, 900 are merely illustrative embodiments of the method of game play to be performed, for example, by a game engine. Such illustrative embodiments are not intended to limit the scope of the invention, as any of numerous other implementations may be performed. For example, variations of processes 800, 900 are possible and are intended to fall within the scope of the invention. None of the claims set forth below are intended to be limited to any particular implementation of the method of game play for a game engine, unless such claim includes a limitation explicitly reciting a particular implementation.

Processes 800, 900, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof.

Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 6, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite, or wireless medium to a user interface. If the game is played completely automatically, the user interface may be merely a video terminal including television with no user input devices. Viewing access may be controlled by standard controls for conditional access including using set top box addresses, telephone numbers, or internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout and game engines, may be implemented using software (e.g., C, C#, C++, Java, or a combination thereof), hardware (e.g., one or more application-specific integrated circuits), firmware (e.g., electrically-programmed memory), or any combination thereof. One or more of the components of 300 may reside on a single system (e.g., payment system 302), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented, for example, on a computer system described below in relation to FIGS. 6 and 7.

System 300 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game play, determining winners, and paying winners. It should be appreciated that the system may perform other functions, including network communication, and the invention is not limited to having any particular function or set of functions.

Figure 6:
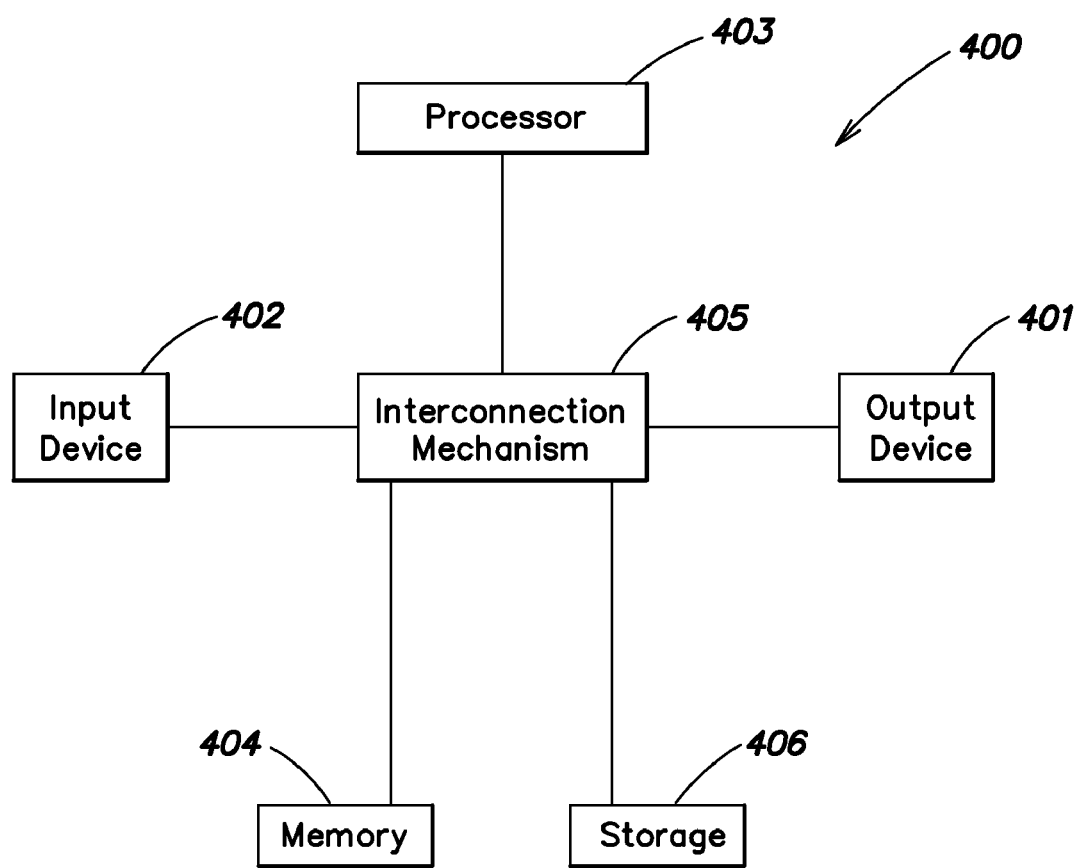
FIG. 6 shows a general-purpose computer system upon which various aspects of the present invention may be implemented.

For example, various aspects of the invention may be implemented as specialized software executing in a general-purpose computer system 400 such as that shown in FIG. 6. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 7:
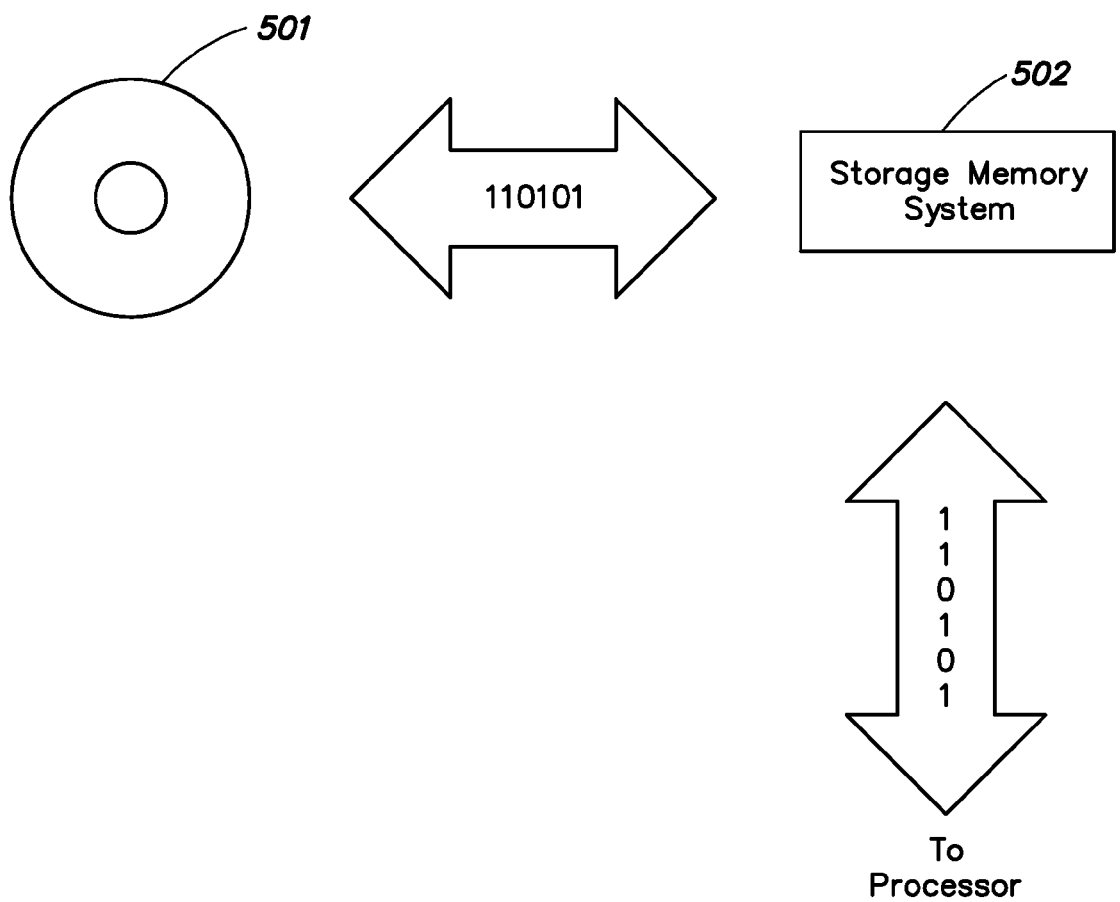
FIG. 7 shows a computer data storage system with which various aspects of the present invention may be implemented.

The storage system 406, shown in greater detail in FIG. 7, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer implemented method of conducting a role playing game using one or more computer systems having a plurality of players comprising acts of:
   providing for an entry of at least one of the plurality of players into at least one session of the role playing game;
   accepting monetary payment of an entry fee from the at least one of the plurality of players, the entry fee being associated with the at least one session of the role playing game;
   determining a player who wins a monetary prize among the plurality of players playing in the at least one game session of the role playing game;
   accepting, by a game engine, at least one monetary wager placed on the at least one of the plurality of players, the at least one monetary wager being a winning wager if the at least one of the plurality of players wins the at least one game session;
   determining a plurality of simultaneous winners;
   selectively displaying information about a first of the plurality of simultaneous winners only in a first geographic location; and
   selectively displaying information about a second of the plurality of simultaneous winners only in a second geographic location, wherein the first geographic location and the second geographic location are different geographic locations.

2. The method according to claim 1, wherein the act of determining the player who wins a prize includes an act of determining a sole survivor among the plurality of players that play the role playing game.

3. The method according to claim 2, further comprising an act of conducting the role playing game including an act of permitting fighting between at least two of the plurality of players.

4. The method according to claim 1, wherein the act of providing the entry includes an act of subscribing the at least one of the plurality of players to a plurality of sessions of the role playing game.

5. The method according to claim 4, wherein the at least one of the plurality of players pays a subscription fee associated with the plurality of sessions of the role playing game with at least one of money, credit, debit, and loyalty program credit.

6. The method according to claim 1, further comprising the at least one monetary wager being the winning wager if the at least one of the plurality of players wins a plurality of game sessions of the role playing game.

7. The method according to claim 1, wherein the role playing game comprises a plurality of game sessions and wherein the act of determining a player who wins a prize includes an act of determining a player that achieves the most points of any player that plays in the plurality of game sessions of the role playing game.

8. The method according to claim 1, wherein the act of providing for an entry of the at least one of the plurality of players into the at least one session of the role playing game comprises an act of providing for an entry of the at least one of the plurality of players in a plurality of game sessions of the role playing game.

9. The method according to claim 8, wherein the act of providing for an entry of the at least one of the plurality of players in a plurality of game sessions is performed within a jurisdiction that permits gambling.

10. The method according to claim 8, wherein the at least one of the plurality of players is permitted to view at least one of the plurality of game sessions in an interface located outside of a jurisdiction that permits gambling.

11. The method according to claim 1, further comprising an act of crediting another one of the plurality of players with points accrued by the at least one player if the another one of the plurality of players eliminates the at least one player from the at least one session of the role playing game.

12. The method according to claim 1, further comprising an act of permitting the at least one player to enter a tournament including a plurality of role playing game sessions, and collecting, from the at least one player, an entry fee for entering the tournament.

13. The method according to claim 1, further comprising an act of permitting at least one user to place the at least one monetary wager on an outcome of the role playing game.

14. The method according to claim 1, further comprising wherein the act of providing an entry includes an act of entering a player into the at least one game session of the role playing game.

15. The method according to claim 1, comprising an act of receiving an entry fee from the player before the player enters the at least one game session of the role playing game.

16. The method according to claim 1, wherein the act of determining the player who wins a prize among the plurality of players further comprises an act of determining which of the players has accumulated the highest number of points in the at least one session of the role playing game.

17. The method according to claim 1, wherein the role playing game comprises a plurality of game sessions of the role playing game, and wherein the act of determining the player who wins a prize among the plurality of players further comprises an act of determining which of the plurality of players has accumulated the highest number of points in the plurality of game sessions of the role playing game.

18. The method according to claim 1, further comprising an act of conducting the game session, the act of conducting the game session comprising an act of providing ammunition for the at least one player to eliminate one or more other players from the at least one game session.

19. The method according to claim 18, wherein the act of conducting the game session further comprises an act of attributing, to the at least one player upon entering the at least one game session, an immortal status.

20. The method according to claim 19, wherein the act of attributing an immortal status to the at least one player is performed over a finite period of time upon entering the game session of the role playing game.

21. The method according to claim 18, wherein the act of conducting the game further comprises an act of prohibiting more experienced players from eliminating at least one new player entering the at least one game session of the role playing game.

22. The method according to claim 1, further comprising an act of conducting the game session, the act of conducting the game session comprises acts of:
   accumulating, for the at least one player, an indicator identifying a worth of the at least one player; and
   increasing the indicator when the at least one player eliminates one or more other players from the at least one game session of the role playing game.

23. The method according to claim 22, wherein the act of conducting the game session further comprises an act of increasing the indicator of the worth of the at least one player by an amount indicated by an indicator of a worth of at least one other player when the at least one player eliminates the at least one other player from the at least one game session of the role playing game.

24. The method according to claim 23, further comprising an act of determining at least one of the plurality of players that has accumulated a highest indicator of worth from among the plurality of players.

25. The method according to claim 24, wherein the act of determining the at least one of the plurality of players that has accumulated a highest indicator of worth is performed at the end of the at least one game session of the role playing game.

26. The method according to claim 24, wherein the game session is conducted within a predetermined period of time.

27. The method according to claim 1, further comprising:
   selectively displaying at least one of a name, city, state, and country of at least one of the first of the plurality of simultaneous winners only in the first geographic location; and
   selectively displaying at least one of a name, city, state, and country of at least one of the second of the plurality of simultaneous winners only in the second geographic location.

28. The method according to claim 1, further comprising:
   while the at least one of the plurality of players plays the at least one session of the role playing game, and prior to an elimination of the at least one of the plurality of players from the at least one session of the role playing game, accepting monetary payment of a service fee from the at least one of the plurality of players to enable the at least one of the plurality of players to purchase elements for use in the at least one session of the role playing game.

29. A non-transitory computer-readable medium having computer-readable signals stored thereon that define instructions that, as a result of being executed by a computer, instruct the computer to perform a method of conducting a role playing game having a plurality of players comprising acts of:
providing for an entry of at least one of the plurality of players into at least one session of the role playing game;
accepting monetary payment of an entry fee by the at least one of the plurality of players, the entry fee being associated with the at least one session of the role playing game;
determining a player who wins a monetary prize among the plurality of players playing in the at least one game session of the role playing game; and
accepting at least one monetary wager placed on the at least one of the plurality of players, the at least one monetary wager being a winning wager if the at least one of the plurality of players wins the at least one game session;
determining a plurality of simultaneous winners;
selectively displaying information about a first of the plurality of simultaneous winners only in a first geographic location; and
selectively displaying information about a second of the plurality of simultaneous winners only in a second geographic location, wherein the first geographic location and the second geographic location are different geographic locations.

30. The computer-readable medium of claim 29, further comprising instructions that, as a result of being executed by the computer, instruct the computer to perform a method of conducting a role playing game having a plurality of players comprising acts of:
selectively displaying at least one of a name, city, state, and country of at least one of the first of the plurality of simultaneous winners only in the first geographic location; and
selectively displaying at least one of a name, city, state, and country of at least one of the second of the plurality of simultaneous winners only in the second geographic location.

31. The computer-readable medium of claim 29, further comprising instructions that, as a result of being executed by the computer, instruct the computer to perform a method of conducting a role playing game having a plurality of players comprising an act of:
while the at least one of the plurality of players plays the at least one session of the role playing game, and prior to an elimination of the at least one of the plurality of players from the at least one session of the role playing game, accepting monetary payment of a service fee by the at least one of the plurality of players to enable the at least one of the plurality of players to purchase elements for use in the at least one session of the role playing game.

32. A distributed computer system for playing a role playing game having a plurality of players, comprising:
a game engine configured to provide for an entry of at least one of the plurality of players into at least one session of the role playing game;
a payment component configured to accept monetary payment of an entry fee by the at least one of the plurality of players, the entry fee being associated with the at least one session of the role playing game;
the game engine configured to determine a player who wins a monetary prize among the plurality of players playing in the at least one game session of the role playing game; and
the game engine configured to accept at least one monetary wager placed on the at least one of the plurality of players, the at least one monetary wager being a winning wager if the at least one of the plurality of players wins the at least one game session;
wherein the game engine is further configured to:
determine a plurality of simultaneous winners;
selectively display information about a first of the plurality of simultaneous winners only in a first geographic location; and
selectively display information about a second of the plurality of simultaneous winners only in a second geographic location, wherein the first geographic location and the second geographic location are different geographic locations.

33. The system of claim 32, wherein:
information about the first of the plurality of simultaneous winners includes at least one of a name, city, state, and country of at least one of the first of the plurality of simultaneous winners; and
information about the second of the plurality of simultaneous winners includes at least one of a name, city, state, and country of at least one of the second of the plurality of simultaneous winners.

34. The system of claim 32, further comprising:
the payment component configured to accept monetary payment of a service fee by the at least one of the plurality of players to enable the at least one of the plurality of players to purchase elements for use in the at least one session of the role playing game while the at least one of the plurality of players plays the at least one session of the role playing game, and prior to an elimination of the at least one of the plurality of players from the at least one session of the role playing game.

35. The system of claim 34, wherein the game engine eliminates the at least one of the plurality of players from the at least one session of the role playing game subsequent to monetary payment of the service fee.

36. The system of claim 34, wherein the elements for use in the at least on session of the role playing game include at least one of ammo, health, weapons, and strength credit.

* * * * *